(12) United States Patent
Fontana et al.

(10) Patent No.: US 8,686,592 B2
(45) Date of Patent: Apr. 1, 2014

(54) SYSTEM AND METHOD FOR COMBINING THE OUTPUTS OF MULTIPLE, DISPARATE TYPES OF POWER SOURCES

(75) Inventors: Edward C. Fontana, Rockwall, TX (US); Paul Smith, Plano, TX (US)

(73) Assignee: General Electric Company, Schenectady, NY (US)

( * ) Notice: Subject to any disclaimer, the term of this patent is extended or adjusted under 35 U.S.C. 154(b) by 678 days.

(21) Appl. No.: 12/831,478

(22) Filed: Jul. 7, 2010

(65) Prior Publication Data

US 2011/0006600 A1    Jan. 13, 2011

Related U.S. Application Data

(60) Provisional application No. 61/225,037, filed on Jul. 13, 2009.

(51) Int. Cl.
*H02J 7/00* (2006.01)
*H02J 9/00* (2006.01)

(52) U.S. Cl.
USPC .......................................................... 307/64

(58) Field of Classification Search
USPC ............................................. 307/25, 64, 72
See application file for complete search history.

(56) References Cited

U.S. PATENT DOCUMENTS

| | | | |
|---|---|---|---|
| 4,185,315 A | 1/1980 | Miller | |
| 4,274,044 A | 6/1981 | Barre | |
| 4,404,472 A | 9/1983 | Steigerwald | |
| 4,608,498 A | 8/1986 | Falzarano et al. | |
| 5,289,046 A | 2/1994 | Gregorich et al. | |
| 5,327,071 A | 7/1994 | Frederick et al. | |
| 6,134,124 A | 10/2000 | Jungreis et al. | |
| 6,134,125 A | 10/2000 | Wenzel | |
| 6,670,721 B2 | 12/2003 | Lof et al. | |
| 7,190,091 B1 | 3/2007 | Marshall | |

(Continued)

FOREIGN PATENT DOCUMENTS

| | | |
|---|---|---|
| GB | 2012080 A | 7/1979 |
| WO | 2004001942 A1 | 12/2003 |
| WO | 2006102928 A1 | 10/2006 |

OTHER PUBLICATIONS

U.S. Appl. No. 12/372,659, filed Feb. 17, 2009 by Jagota, et al., entitled "DC Plant Controller and Method for Selecting Among Multiple Power Sources and DC Plant Employing the Same."

(Continued)

*Primary Examiner* — Carlos Amaya
(74) *Attorney, Agent, or Firm* — Dolly Wu; General Electric Company

(57) ABSTRACT

A system for, and method of, combining the outputs of multiple, disparate types of power sources and an isolated converter module employed in the same. In one embodiment, the system includes: (1) a plurality of isolated converter modules having power inputs couplable to corresponding disparate types of power sources and a DC-output converter configured to convert power received from at least one of the power sources to DC power and (2) a DC bus coupled to power outputs of the plurality of isolated converter modules and configured to receive and aggregate the DC power. With such system, a universal converter module can be employed to identify and convert power from a variety of conventional and renewable power sources.

20 Claims, 4 Drawing Sheets

(56) References Cited

U.S. PATENT DOCUMENTS

| | | |
|---|---|---|
| 7,274,975 B2 | 9/2007 | Miller |
| 7,378,820 B2 | 5/2008 | Liu et al. |
| 7,560,906 B2 | 7/2009 | Liu et al. |
| 7,615,875 B1 | 11/2009 | Henneberg et al. |
| 7,646,620 B2 | 1/2010 | MacDonald et al. |
| 2005/0162836 A1* | 7/2005 | Briggs et al. ............. 361/724 |
| 2005/0275386 A1* | 12/2005 | Jepsen et al. ............. 322/9 |
| 2007/0273210 A1* | 11/2007 | Wang et al. ............. 307/45 |
| 2008/0217998 A1 | 9/2008 | Parmley |
| 2009/0160258 A1* | 6/2009 | Allen et al. ............. 307/82 |

OTHER PUBLICATIONS

Fuzzy Control for Parallel Operation of Power Multi-Sources; Adriano S. Carvalho, et al.; European Space Agency—Provided by the NASA Astrophysics Data System; 8 pages, 2002.

Suntech, Solar powering a green future; www.suntech-power.com; 2008, 2 pages.

Sharp, Solar electricity, www.dcpower-systems.com, 2009, 2 pages.

Extended European Search Report for Application No. 10169014; Nov. 12, 2013; 6 pages.

* cited by examiner

SYSTEM AND METHOD FOR COMBINING THE OUTPUTS OF MULTIPLE, DISPARATE TYPES OF POWER SOURCES

CROSS-REFERENCE TO RELATED APPLICATION

This application claims the benefit of U.S. Provisional Application Ser. No. 61/225,037, filed by Fontana, et al., on Jul. 13, 2009, entitled "Lineage Priority Source Power Center," commonly assigned with this application and incorporated herein by reference. This application is also related to U.S. patent application Ser. No. 12/372,659, filed by Jagota, et al., on Feb. 17, 2009, entitled "DC Plant Controller and Method for Selecting Among Multiple Power Sources and DC Plant Employing the Same," commonly assigned with this application and incorporated herein by reference.

TECHNICAL FIELD

This application is directed, in general, to power conversion and, more specifically, to a system and method for combining the outputs of multiple, disparate types of power sources.

BACKGROUND

Telecommunication service providers are adding alternative (e.g., "green") power sources as options for powering evermore of their telecommunication sites, such as central offices and cell towers. This brings real benefits in operating costs and commercial electric power "grid" independence, yet it also introduces a host of new, often disparate equipment to the network that the service providers must maintain and replace as years go by. As a consequence, the equipment threatens the sustainability of the network and its quality of service. The risk is particularly acute when the equipment is exposed to weather and lightning, which is almost always the case.

Complicating matters, disparate types of power sources have different priorities of use. For example, renewable power sources, such as solar and wind power, should be preferred and therefore have a higher priority than fossil-fuel-powered backup generators and fee-based, and possibly also fossil-fuel-powered, commercial electric power. Being lower in priority, the latter should only be used only as necessary. Because they are typically reserved for emergency use, backup batteries may have the lowest priority.

SUMMARY

One aspect provides a system for combining the outputs of multiple, disparate types of power sources. In one embodiment, the system includes: (1) a plurality of isolated converter modules having power inputs couplable to corresponding disparate types of power sources and a DC-output converter configured to convert power received from at least one of the power sources to DC power and (2) a DC bus coupled to power outputs of the plurality of isolated converter modules and configured to receive and aggregate the DC power.

Another aspect provides an isolated converter module. One embodiment of the module includes: (1) a power input, (2) a source recognition circuit coupled to the power input and configured to receive a signal based on at least one characteristic of power received via the power input and recognize a power source type based on the at least one characteristic, (3) a parameter selection circuit coupled to the priority determination circuit and configured to select operating parameters based on the power source type, (4) a converter controller coupled to the parameter selection circuit and configured to provide drive signals in accordance with the operating parameters, (5) a DC-output converter coupled to the converter controller and configured to receive the drive signals and convert the power to DC form and (6) a power output configured to receive the power converted to the DC form from the DC-output converter.

Yet another aspect provides a method of combining the outputs of multiple, disparate types of power sources. One embodiment of the method includes: (1) recognizing the types of each of the multiple power sources, (2) selecting respective operating parameters based on the types, (3) converting power to DC form according to the converter controller parameters and (4) combining the power in the DC form in a common DC bus.

Still another aspect provides a telecommunications rectifier. In one embodiment, the rectifier includes: (1) a power input, (2) a converter controller configured to provide drive signals for converting power received from either the commercial electric power grid or a renewable power source, (3) a DC-output converter coupled to the power input and the converter controller and configured to receive the drive signals and convert the power to DC form and (4) a power output configured to receive the power converted to the DC form from the DC-output converter.

BRIEF DESCRIPTION

Reference is now made to the following descriptions taken in conjunction with the accompanying drawings, in which.

DETAILED DESCRIPTION

Figure 1:
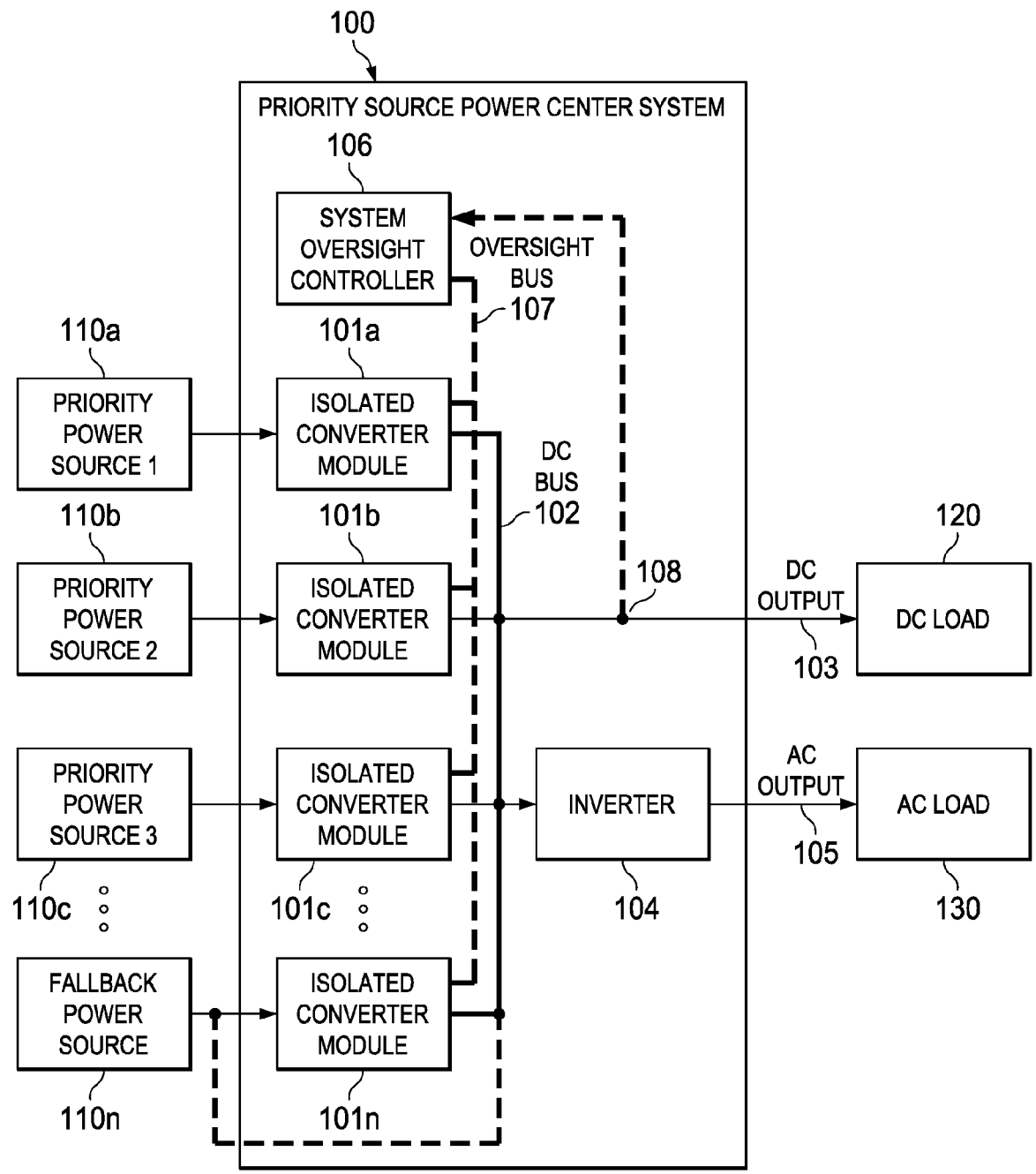
FIG. 1 is a high-level block diagram of one embodiment of a system for combining the outputs of multiple, disparate types of power sources.

To date, suppliers of alternative energy equipment have used distributed generation (DG), colloquially known as "grid-tying," to incorporate alternative power sources. DG involves coupling alternative power sources to the commercial alternating current (AC) power grid such that the sources can synchronize with, and supply power to, the grid. The grid then supplies any and all loads, including the telecommunication equipment. Unfortunately, grid-tying incurs both AC conversion inefficiencies and the risk of propagating transient high voltage ("spikes") resulting from lightning. For these reasons, service providers have resisted grid-tying.

Described herein are various embodiments of a system and method that employ standard power conversion modules to form a redundant, fault-tolerant system that can aggregate power from various, disparate, often both alternative and conventional, power sources while maintaining sufficient isolation to resist faults emanating from a particular power source. Power from the various sources is converted to direct current (DC) of appropriate voltage and then aggregated. Thereafter, the DC may be used to power DC loads or converted to AC, after which it may be used to power AC loads. In a telecommunication environment, these loads may include backup batteries and telecommunication equipment.

The system and method call for the power sources to be galvanically isolated from one another to frustrate fault propagation. Various embodiments of the system and method employ transformers in the converters to provide isolation; a magnetic field transfers power while providing isolation. Those skilled in the art understand other circuits that can be employed to provide isolation. Various embodiments of the system and method employ diodes to aggregate power from the various sources in a straightforward manner. Those skilled in the art understand that other devices and circuits can be employed to aggregate the power.

Certain embodiments of the system and method address the issues of spare parts stocking ("sparing") and network sustainability ("uptime") by employing uniform converter modules, which may be synonymously regarded as "identical," "universal" or "generic," that are configured to adapt themselves to convert power received from different types of power sources. A single type of converter module can be used to convert power from multiple source types, e.g., solar, wind, water, geothermal, commercial grid, emergency generator or backup battery. A service provider need only stock the single converter type to ensure converter spare availability for any source.

Certain other embodiments also address concerns that alternative power sources could put essential network functions at risk by accommodating priority operation, namely preferentially employing alternative power sources but ensuring that more conventional and perhaps reliable power sources are available to be employed if or when the alternative power sources are interrupted. In some of the embodiments described in detail herein, isolated converter modules are configured to recognize the type of power source from which they are receiving power, determine the priority that the type of power source should have, select parameters according to which the power received from the power source is converted and then convert that power to DC in accordance with the parameters.

Still other embodiments are capable of operating at an increased efficiency by selectively turning off isolated converter modules when multiple such modules are coupled to an alternative power source and fewer than all such modules are capable of supplying the power received from the alternative power source. Further embodiments are capable of employing power factor correction to receive power from alternative power sources at optimally efficient output voltages for those alternative power sources and convert the power at optimally efficient DC-output converter input voltages.

FIG. 1 is a high-level block diagram of one embodiment of a system 100 for combining the outputs of multiple, disparate types of power sources. The embodiment illustrated in FIG. 1 takes the form of a rack-mounted assemblage of modular equipment. Accordingly, the system 100 is illustrated as including a plurality of isolated converter modules 101a, 101b, 101c, . . . , 101n. A DC bus 102 couples the outputs of the plurality of isolated converter modules 101a, 101b, 101c, . . . , 101n together and provides a DC output 103, as FIG. 1 indicates, suitable for powering a DC load 120. In one embodiment, a DC-DC converter may be employed to power a DC load that requires a voltage differing from that provided by the DC bus 102. For applications that would benefit from an AC output, the DC bus 102 may be coupled to an inverter 104 (a DC-AC converter), which provides an AC output 105, as FIG. 1 indicates, suitable for powering an AC load 130.

The plurality of isolated converter modules 101a, 101b, 101c, . . . , 101n receive power from a corresponding plurality of power sources 110a, 110b, 110c, . . . , 110n. Because various embodiments is configured to determine relative priorities of the power sources 110a, 110b, 110c, . . . , 110n, the power sources 110a, 110b, 110c are labeled priority power sources, indicating that they have (typically differing) priorities higher than a lowest priority, and the power source 110n is labeled a fallback power source, indicating that it has the lowest priority. In the illustrated embodiment, the priority power source 1 110a is a solar-derived power source (e.g., a solar panel), the priority power source 2 110b is a wind-derived power source (e.g., a turbine-driven generator), the priority power source 3 110c is the commercial electric power grid (which may also be regarded as a first backup power source), and the fallback power source 110n is a backup power source (e.g., one or more fuel cells, one or more batteries or one or more strings of batteries). If the backup power source is one or more fuel cells, one or more batteries or one or more strings of batteries, it may be coupled directly to the DC bus 102 (as a broken line coupling the fallback power source 110n and the DC bus 102 indicates) or isolated by a charger (not shown) that draws its power from the DC bus 102 or any of the other power sources 110a, 110b, 110c, . . . .

As will be described in greater detail in conjunction with FIG. 2 below, each of the plurality of isolated converter modules 101a, 101b, 101c, . . . , 101n is capable of operating independently of the others. However, the embodiment illustrated in FIG. 1 employs a system oversight controller 106 configured to monitor and supervise the plurality of isolated converter modules 101a, 101b, 101c, . . . , 101n to ensure that they are cooperating properly and constructively with respect to one another. An oversight bus 107 couples the system oversight controller 106 to each of the plurality of isolated converter modules 101a, 101b, 101c, . . . , 101n. In performing its functions, the system oversight controller 106 may make decisions based on input signals received from the plurality of isolated converter modules 101a, 101b, 101c, . . . , 101n via the oversight bus 107 and one or more characteristics of the DC bus 102, e.g., sensed at a control point 108. The one or more characteristics may include voltage, current or any other desired characteristic.

Figure 2:
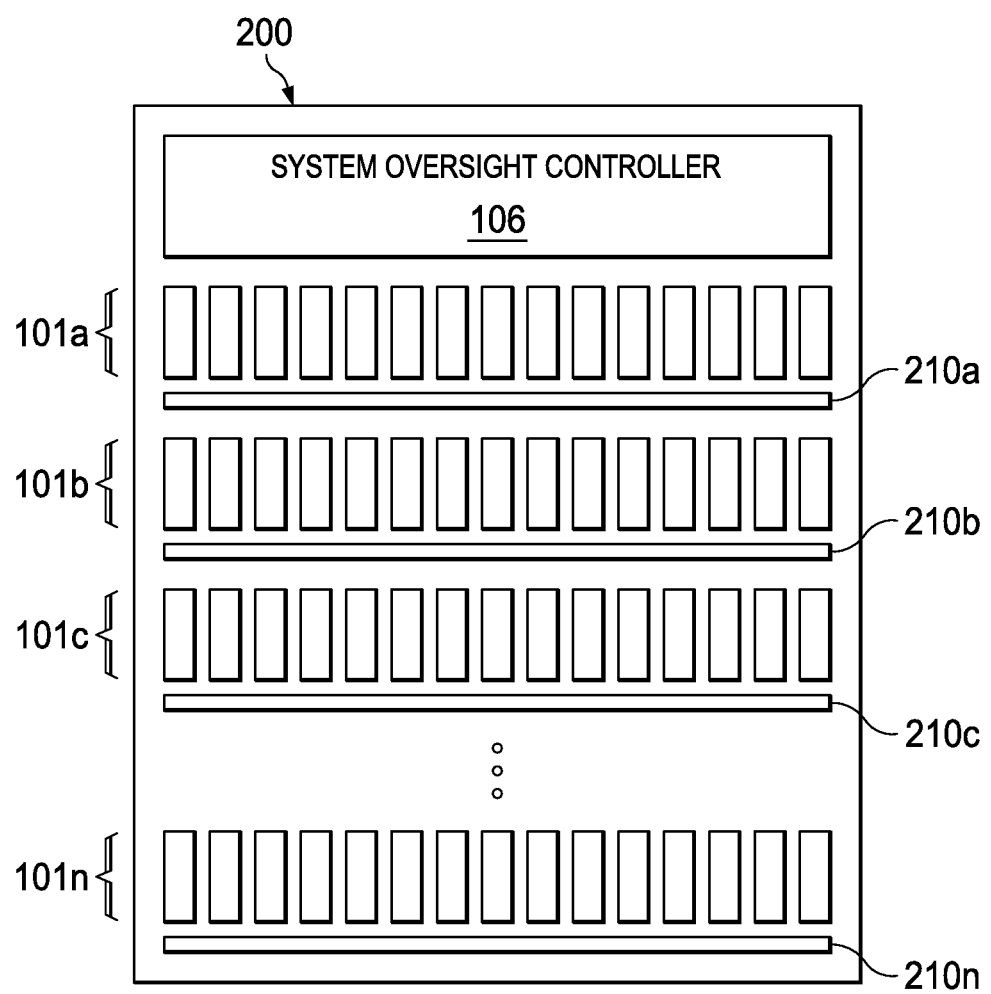
FIG. 2 is an elevational view of one embodiment of an equipment rack containing multiple shelves and capable of containing a system for combining the outputs of multiple, disparate types of power sources.

Turning briefly to FIG. 2, illustrated is an elevational view of one embodiment of an equipment rack 200 containing multiple shelves and capable of containing a system for combining the outputs of multiple, disparate types of power sources. The rack 200 may be, for example, a standard equipment rack in a conventional battery plant (e.g., as may be located in a telecommunication facility such as a central office, or CO). FIG. 2 illustrates a plurality of shelves 210a, 210b, 210c, . . . , 210n configured to support one or more isolated converter modules 101a, 101b, 101c, . . . , 101n. In the illustrated embodiment, the isolated converter modules 101a, 101b, 101c, . . . , 101n on a given shelf 210a, 210b, 210c, . . . , 210n are dedicated to a particular type of power source. For example, the isolated converter modules 101a on the shelf 210a may be dedicated to converting power received from one or more wind-driven energy sources, and the isolated converter modules 101n on the shelf 210n may be dedicated to converting power received from one or more backup batteries or battery strings. In one specific embodiment, separate isolated converter modules 101a are employed to convert each phase of a single wind-driven energy source. In another embodiment, a single isolated converter module 101a is employed to convert power received from multiple wind-driven energy sources. Those skilled in the art will understand that the isolated converter modules 101a, 101b, 101c, ..., 101n may be arranged in any manner, however.

Each shelf 210a, 210b, 210c, ..., 210n may support one or more spare isolated converter modules, 101a, 101b, 101c, ..., 101n that are either wholly disconnected from the remainder of the system, connected to the remainder of the system and placed on standby or connected to the remainder of the system and operating at less than full output current. The latter two configurations are colloquially regarded as "hot-swappable." In a system having a "hot-swappable" module, one or more standby converter modules may be substituted for one or more malfunctioning converter modules automatically, and without requiring human knowledge or intervention. In the illustrated embodiment, the system oversight controller 106 may command this substitution, typically based at least in part on signals received from any malfunctioning converter modules. As described below in conjunction with FIG. 3, the isolated converter modules 101a, 101b, 101c, ..., 101n may perform power factor and voltage adjustments to increase the power received from a power source and optimize conversion efficiency.

Inherent in the latter two configurations described above is the ability to perform "N+1 sparing" or, more generally, "N+M sparing," where N=1 or a greater integer. For example, N+1 isolated converter modules may be used for converting power from a given power source, when only N isolated converter modules are required to convert the power. Under N+1 sparing, each isolated converter module converts $1/(N+1)^{th}$ of the power received from the power source. If one isolated converter module malfunctions, each of the remaining N isolated converter modules then converts $1/N^{th}$ of the power. N+M sparing would call for M isolated converter modules in excess of the N required to convert the power.

FIG. 2 also shows one embodiment of the system oversight controller 106, which happens to be located over the shelves 210a, 210b, 210c, ..., 210n in the illustrated embodiment. Although FIG. 2 does not show them, a DC bus and an oversight bus couple the various isolated converter modules 101a, 101b, 101c, ..., 101n and the system oversight controller 106 together as indicated above. In the illustrated embodiment, the DC and oversight buses run along a rear surface of the rack 200 and include backplane connectors that allow the isolated converter modules 101a, 101b, 101c, ..., 101n and perhaps the system oversight controller 106 to be plugged into them as they are inserted into the rack 200.

As described above, the illustrated embodiment of each of the plurality of isolated converter modules 101a, 101b, 101c, ..., 101n of FIGS. 1 and 2 is configured to recognize the type of power source from which they are receiving power, determine the priority that the type of power source should have, select parameters according to which the power received from the power source is converted and then convert that power to DC in accordance with the parameters. Thus, various embodiments of one of the isolated converter modules 101a, 101b, 101c, ..., 101n will now be described.

Figure 3:
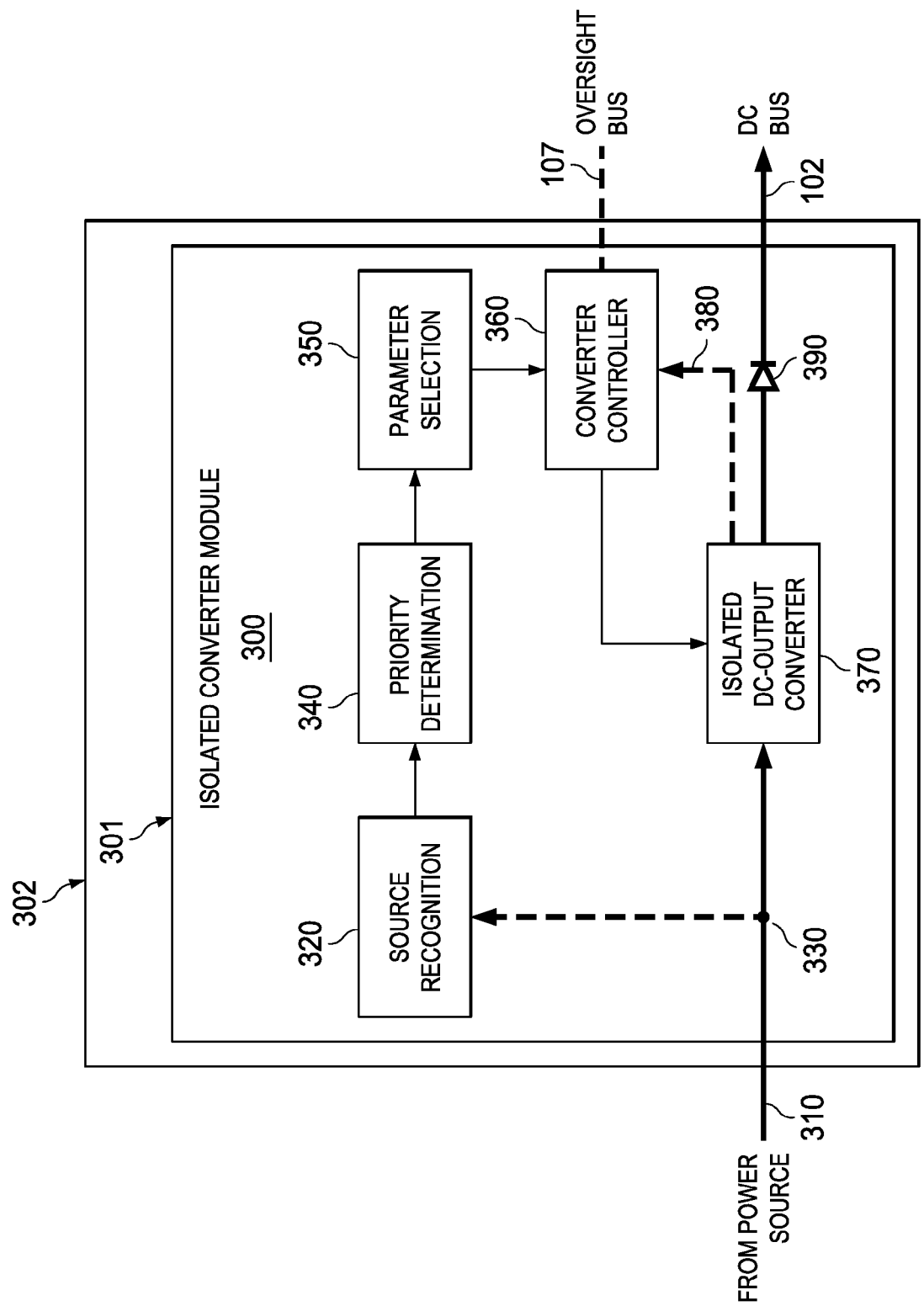
FIG. 3 is a block diagram of one embodiment of an isolated converter module of the system of FIG. 1.

FIG. 3 is a block diagram of one embodiment of an isolated converter module 300 of the system of FIG. 1. The illustrated embodiment of the module 300 is embodied in a plurality of circuits mounted on a circuit board 301 and, in some embodiments, encased in a protective shell 302. In various embodiments, the module 300 features backplane connectors (not shown, since FIG. 3 shows the module 300 in conceptual, rather than physical, form) that allow the module to be inserted into the rack 200 of FIG. 2 and be coupled to the backplane thereof. Typically, the backplane connectors would provide for most, if not all, of the electrical connections that need to be made with the module 300.

The module 300 may also include one or more status indicators (e.g., lights) on a front edge thereof (not shown) to indicate, among other things, the operating status of the module 300. In some embodiments, the dimensions of the protective shell and the placement of the backplane connectors are standardized that the modules are uniform and may be plugged into any one of a plurality of uniformly sized slots in a rack (e.g., the rack 200 of FIG. 2).

The module 310 includes a power input 310 configured to receive power from a power source and a power output that leads to the DC bus 102. A source recognition circuit 320 receives, from a control point 330, a signal based on at least one characteristic of the power received via the power input 310. The at least one characteristic may be one or more of a voltage, a current, a frequency, a phase, a DC offset, an impedance, a power factor, a harmonic content or any other characteristic of interest. In the illustrated embodiment, the characteristic is voltage. The source recognition circuit 320 is configured to identify the type of the power source based on the characteristic.

For example, a voltage signal having a relatively constant 50 or 60 Hz frequency indicates that the power source is either a fossil-fuel-powered AC backup generator or the commercial electric power grid. By monitoring the voltage signal over a substantial period of time, interruptions or substantial frequency variations may occur by which it can be inferred whether the power source is a fossil-fuel-powered AC backup generator or the commercial electric power grid.

As another example, a voltage signal exhibiting significant frequency variations over time and often exceeding 60 Hz indicates an AC wind-driven power source. A low-frequency (e.g., less than 1 Hz) or DC voltage indicates that the power source is either a solar panel, a fossil-fuel-powered DC backup generator or a DC wind-driven power source. By monitoring the voltage signal over a substantial period of time (e.g., over a day and a night), interruptions or voltage variations may occur by which it can be inferred whether the power source is a solar panel, a fossil-fuel-powered DC backup generator or a DC wind-driven power source. Based on the characteristic, perhaps sensed over time, the source recognition circuit 320 is configured to recognize the type of the power source and provides a signal indicating the type.

The illustrated embodiment of the module 300 is configured for use in systems in which disparate types of power sources have priorities. Accordingly, a priority determination circuit 340 is coupled to the source recognition circuit 320. The priority determination circuit 340 is configured to receive the signal from the source recognition circuit 320 that indicates the type of the power source and determine a priority that the power source should have based on the signal. As stated above, power derived renewable energy sources are likely to have a higher priority than emergency power, power derived from fossil fuel or power that needs to be purchased (i.e., the commercial electric power grid). The priority determination circuit 340 is further configured to provide a signal indicating the priority.

In the illustrated embodiment, priority is carried out by assigning nominal relative output voltages to the DC-output converters. In the illustrated embodiment, power from disparate sources is combined in a DC bus using diodes coupled to the outputs of the power converters corresponding to each source. In this embodiment, power sources are prioritized in the relative converter output voltages. A converter assigned a higher output voltage naturally causes that converter to supply more power to the DC bus 102 than another converter having a lower output voltage.

For example, if the DC bus 102 is nominally a 48 V bus, a first converter may be assigned to operate in a range around a nominal 48.1 V output voltage, a second converter may be assigned to operate in a range around a nominal 48.0 V output voltage, and a third converter may be assigned to operate in a range around a nominal 47.9 V output voltage. In this example, the first converter will naturally provide power to the DC bus 102 until it either reaches its current limit and output voltage begins to decrease. When the output voltage of the first converter reaches 48.0 V, the second converter will likely begin to contribute power to the DC bus 102. Likewise, the first and second converters will share the burden of providing power to the DC bus 102 until their output voltages decrease to 47.9 V, at which point the third converter will likely begin to contribute its power to the DC bus 102 as well. Those skilled in the art will understand that if any of the power sources is interrupted outright, its corresponding converter will stop contributing power to the DC bus 102, and other converters will make up for the lost power. In a well-designed system, the converter having the lowest output voltage (i.e., the lowest priority) is assumed always to be available to provide power to the DC bus 102.

The above example illustrates a type of maximum power point tracking (MPPT), recognizing that sustainable power sources typically have a limited source impedance that varies with time. The power drawn from them should therefore be carefully managed to be maximized. For this reason, various embodiments of the converters are configured to recognize the nature of the source and adjust the power drawn from the source continually over time to extract energy with relatively low power loss. When power is available from one or more renewable sources, those converters connected to the renewable sources adjust their output current to provide a larger fraction of the total power being delivered to the load. MPPT can be used to advantage with respect to renewable sources, allowing output voltage to be adjusted continually to keep the power drawn from one or more renewable sources at or near their maximum. For this reason, continual (time-varying) adjustment of output current based on availability of the renewable source can be important.

A parameter selection circuit 350 is coupled to the priority determination circuit 340. The parameter selection circuit 350 is configured to select operating parameters appropriate for converting power received at the power input 310 to a form appropriate for the DC bus 102 (i.e., based on the type recognized by the source recognition circuit 320). In the illustrated embodiment, the parameter selection circuit 350 also selects operating parameters based on the priority determined by the priority determination circuit 340. For example, if the source recognition circuit 320 determines that the input power is DC power provided by a solar panel, the parameter selection circuit selects operating parameters appropriate for DC-DC conversion. Further, because solar energy typically has a relatively high priority, the operating parameters are likely to call for the module 300 to have a higher output voltage.

In an alternative embodiment, priority is carried out by setting relative current limit points of the DC-output converters. Those skilled in the pertinent art are familiar with current limit control and how current limit control can be carried out to effect load sharing and, by extension, priority. Those skilled in the pertinent art will also understand that other techniques may be employed to establish load sharing and priority.

A converter controller 360 is coupled to the parameter selection circuit 350. The converter controller 360 is configured to provide drive signals to an isolated DC-output converter 370 in accordance with the operating parameters provided by the parameter selection circuit 350. The converter controller 360 typically receives signals (e.g., voltage, current or temperature signals) back from the isolated DC-output converter 370 that allow it to adapt its control to accommodate changing circumstances (e.g., changes in input or output voltage or current). Those skilled in the art are familiar with various converter topologies capable of converting DC or AC input power to DC form. Therefore, the operation of the isolated DC-output converter 370 will not be further described herein. It should also be noted that the converter controller 360 is coupled to the oversight bus 107. This allows the converter controller 360 to provide signals indicating its status and/or operation to the system oversight controller 106 of FIG. 1 and/or receive command signals from the system oversight controller 106 that can alter the operation of the converter controller 360.

Many of the above-described circuits may be embodied as discrete or integrated circuits ("hardware") or as a sequence of instructions ("software" or "firmware") executable on a general-purpose processor to carry out desired functions. The scope of the invention includes all such embodiments.

As stated above, the modules in a given system galvanically isolate the disparate types of power sources from one another and the DC bus. Accordingly, the module 300 provides galvanic isolation. In the illustrated embodiment, the isolated DC-output converter 370 provides isolation in the form of a transformer (not shown) having distinct primary and secondary windings, forcing power transfer to occur via the transformer's magnetic field. In alternative embodiments, isolation is provided outside of the converter 370 and/or by conventional or later-developed galvanic isolation techniques other than magnetic field-based techniques.

In the illustrated embodiment, the DC-output converter 370 includes a DC-DC resonant stage (not shown) coupled to a secondary winding of the transformer. The DC-DC resonant stage is configured to employ zero-voltage switching to minimize switching stress and power dissipation. The illustrated embodiment of the DC-output converter 370 also includes a boost stage (not shown) coupled to a primary winding of the transformer. The boost stage is configured to adjust a power factor of the power and accommodate any voltage difference that may exist between an operating voltage of a renewable power source coupled to the power input 310 and the optimum input voltage of the DC-DC resonant stage. Those skilled in the art are familiar with DC-DC resonant stages, zero-voltage switching, boost stages and power factor adjustment. A general discussion of these will therefore not be undertaken herein.

As stated above, the illustrated embodiment of the system employs diodes to combine the power from the disparate sources. In the illustrated embodiment, each module 300 in a given system incorporates a diode for that purpose. Accordingly, FIG. 3 shows a forward-biased diode 390 coupled to the output of the isolated DC-output converter 370. The diode 390 is forward-biased to attenuate substantial currents before they can enter the module 300 from the DC bus 102. This not only substantially prevents one converter module from providing power to another converter module, but at least partially prevents fault currents (e.g., transients resulting from lightning strikes) from propagating into the module 300 and further at least partially prevents a malfunctioning module from draining power from the DC bus 102.

Alternative embodiments employ a relay, a field-effect transistor (FET) or other type of controllable switch to combine the power from the disparate sources. Those skilled in the pertinent art understand that various conventional and later-developed devices or circuits may be employed to combine the power from the disparate sources and therefore fall within the broad scope of the invention.

Turning back to FIG. 1, the operation of the illustrated embodiment of the system oversight controller 106 can now be described more fully. As stated above, the illustrated embodiment of the system oversight controller 106 may be capable of determining when a particular converter module is malfunctioning and, in some embodiments, substituting another module for the malfunctioning module. In various embodiments, the system oversight controller 106 is also configured to monitor the DC bus 102 to regulate its voltage. In certain other embodiments, the system oversight controller 106 is configured to monitor the isolated converter modules 101a, 101b, 101c, . . . , 101n to ensure that they are not exceeding their current limits or operating at excessive temperatures. The system oversight controller 106 may also be configured to monitor the isolated converter modules 101a, 101b, 101c, . . . , 101n to determine whether or not the priorities are proper. The system oversight controller 106 may alternatively or further be configured to generate operating logs and/or maintenance or warning signals indicating conditions that need attention. The system oversight controller 106 may provide the operating logs and/or maintenance or warning signals via a network connection for remote storage or receipt. Those skilled in the pertinent art will understand that the system oversight controller 106 may be employed to perform alternative or additional functions from which a particular application or installation may benefit.

Figure 4:
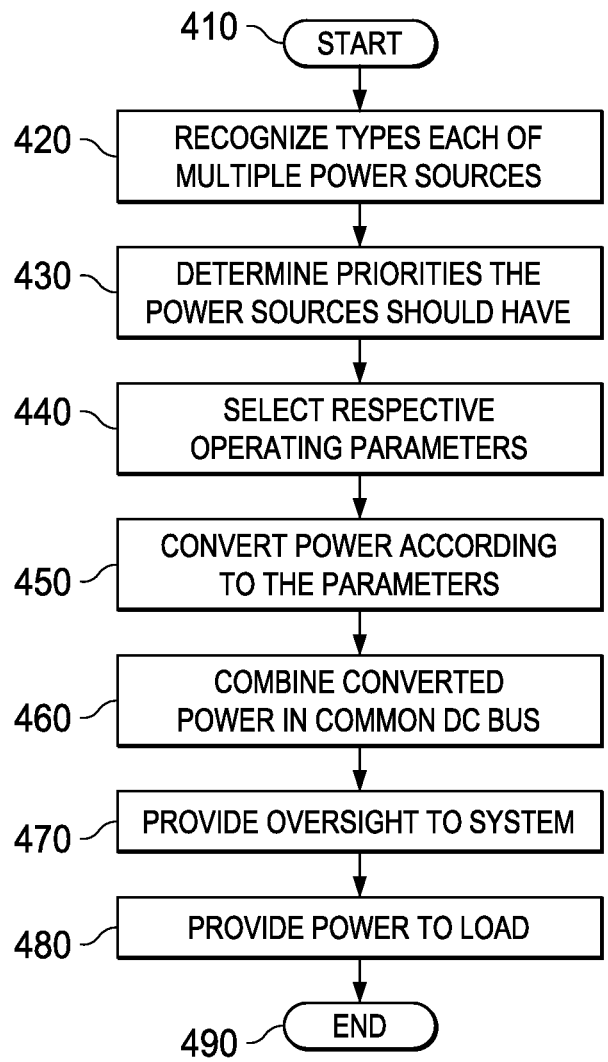
FIG. 4 is a flow diagram of one embodiment of a method of combining the outputs of multiple, disparate types of power sources.

FIG. 4 is a flow diagram of one embodiment of a method of combining the outputs of multiple, disparate types of power sources. The method begins in a start step 410. In a step 420, types of each of multiple power sources is recognized. In a step 430, priorities for the power sources are determined. In a step 440, operating parameters are selected for DC-output converters corresponding to the power sources. In one embodiment, at least some of the operating parameters are based on the priorities for the corresponding power sources. In a step 450, the DC-output converters operate to convert power to DC form according to the converter controller parameters. In a step 460, the converted power is combined in a common DC bus. In a step 470, oversight is provided to the system. In a step 480, power is provided from the common DC bus to a load. DC power may be provided (1) directly to a DC load, (2) through a DC-DC converter to the DC load, or (3) through an inverter to an AC load. The method ends in an end step 490.

Those skilled in the art to which this application relates will appreciate that other and further additions, deletions, substitutions and modifications may be made to the described embodiments.

What is claimed is:

1. A system for combining the outputs of multiple, disparate types of power sources, comprising:
    a plurality of isolated converter modules, each isolated converter module comprising:
        a power input configured to receive power from at least one of an AC power source and a DC power source;
        a source recognition circuit configured to receive at least one characteristic of the power and indicate a type of power source supplying the power based on the at least one characteristic;
        a DC-output converter configured to convert power received from at least one of said power sources to DC power; and
        a power output configured to output said DC power; and
    a DC bus coupled to said power outputs of said plurality of isolated converter modules and configured to receive and aggregate said DC power.

2. The system as recited in claim 1 wherein at least one of said plurality of isolated converter modules further comprises a parameter selection circuit that selects operating parameters according to which said power is to be converted based on the type of power source indicated by said source recognition circuit, wherein a corresponding one of said plurality of isolated converter modules converts said power to DC in accordance with said operating parameters.

3. The system as recited in claim 2 wherein at least one of said plurality of isolated converter modules is further configured to determine a priority that said type of power source is to have and select at least one of said operating parameters based on said priority.

4. The system as recited in claim 1 wherein at least some of said plurality of isolated converter modules are identical.

5. The system as recited in claim 1 further comprising a system oversight controller coupled to said plurality of isolated converter modules and configured to monitor and supervise said plurality of isolated converter modules.

6. The system as recited in claim 5 wherein said system oversight controller is further configured to detect when one of said plurality of isolated converter modules is malfunctioning and automatically substitute a standby converter module therefor.

7. The system as recited in claim 5 wherein said system oversight controller is coupled to said plurality of isolated converter modules through an oversight bus.

8. The system as recited in claim 1 further comprising a rack having shelves configured to support said plurality of isolated converter modules.

9. The system as recited in claim 1 wherein each of said plurality of isolated converter modules has a diode coupled between said DC-output converter and said power output.

10. The system as recited in claim 1 wherein said DC-output converter comprises:
    a transformer comprising a primary winding and a secondary winding;
    a boost stage coupled to said primary winding; and
    a DC-DC resonant stage coupled to said secondary winding.

11. The system as recited in claim 1 further comprising an inverter coupled to said DC bus.

12. The system as recited in claim 1, wherein said plurality of isolated converter modules are configured to galvanically isolate the multiple, disparate types of power sources from one another.

13. The system as recited in claim 1, wherein each power input is configured to process at least one of solar, wind, geothermal, grid, generator, and battery power, and each source recognition circuit is configured to indicate said power source is at least one of a solar, wind, geothermal, grid, and battery type power source.

14. A method of combining the outputs of multiple, disparate types of power sources, comprising:
    accepting and processing power from at least one of an AC power source and a DC power source at each power input of a power module;
    recognizing a type of each of said multiple power sources based on a characteristic of the power;
    selecting respective operating parameters based on said types of said multiple power sources;
    converting power to DC form according to said selected operating parameters; and combining said power in said DC form to a common DC bus.

15. The method as recited in claim 14 further comprising determining priorities that each of said power sources should have, and said selecting respective operating parameters includes selecting at least some of said operating parameters based on said priorities.

16. The method as recited in claim 14 wherein said converting comprises employing transformer-isolated DC-output converters.

17. The method as recited in claim 14 further comprising at least one of:
   providing said converted power in DC form directly to a DC load,
   providing said converted power in DC form through a DC-DC converter to said DC load, and
   providing said converted power in DC form through an inverter to an AC load.

18. The method as recited in claim 14 wherein said combining comprises employing forward-biased diodes.

19. The method as recited in claim 14 further comprising automatically:
   detecting a malfunctioning converter; and
   substituting a standby converter therefor.

20. The method as recited in claim 14, further comprising compatibly receiving at least one of the following types of power at each power input: solar, wind, geothermal, grid, generator, and battery, and wherein recognizing said type of power source includes recognizing said power source is at least one of a solar, wind, geothermal, grid, and battery type power source.

* * * * *

UNITED STATES PATENT AND TRADEMARK OFFICE
CERTIFICATE OF CORRECTION

PATENT NO. : 8,686,592 B2  Page 1 of 1
APPLICATION NO. : 12/831478
DATED : April 1, 2014
INVENTOR(S) : Fontana et al.

It is certified that error appears in the above-identified patent and that said Letters Patent is hereby corrected as shown below:

In the Specification

In Column 6, Line 9, delete "module 310" and insert -- module 300 --, therefor.

Signed and Sealed this
Fifteenth Day of July, 2014

Michelle K. Lee
*Deputy Director of the United States Patent and Trademark Office*